United States Patent
Intelmann et al.

(10) Patent No.: US 10,147,551 B2
(45) Date of Patent: Dec. 4, 2018

(54) MONOFUNCTIONAL AMINES AS ADHESION PRIMERS FOR CONDUCTIVE POLYMERS

(71) Applicant: Heraeus Deutschland GmbH & Co. KG, Hanau (DE)

(72) Inventors: Matthias Intelmann, Cologne (DE); Udo Merker, Cologne (DE); Klaus Wussow, Netphen (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 0 days.

(21) Appl. No.: 15/309,545

(22) PCT Filed: May 29, 2015

(86) PCT No.: PCT/EP2015/061939
§ 371 (c)(1),
(2) Date: Nov. 8, 2016

(87) PCT Pub. No.: WO2015/181348
PCT Pub. Date: Dec. 3, 2015

(65) Prior Publication Data
US 2017/0186553 A1    Jun. 29, 2017

(30) Foreign Application Priority Data
May 30, 2014   (EP) .................................. 14001879

(51) Int. Cl.
*H01G 9/00* (2006.01)
*H01G 9/028* (2006.01)
*H01G 9/15* (2006.01)

(52) U.S. Cl.
CPC .......... *H01G 9/0036* (2013.01); *H01G 9/028* (2013.01); *H01G 9/15* (2013.01)

(58) Field of Classification Search
CPC ... H01G 9/0029; H01G 9/0032; H01G 9/0036
See application file for complete search history.

(56) References Cited

U.S. PATENT DOCUMENTS

| 2012/0057275 A1* | 3/2012 | Intelmann | H01G 9/028 361/523 |
| 2012/0206859 A1* | 8/2012 | Chacko | H01G 9/0036 361/529 |

FOREIGN PATENT DOCUMENTS

| DE | 102011080338 A1 | 2/2012 |
| DE | 102013204390 A1 | 9/2013 |
| FR | 2988212 A1 | 9/2013 |

(Continued)

OTHER PUBLICATIONS

International Search Report issued in PCT/EP2015/061939 dated Jul. 3, 2015.

*Primary Examiner* — Scott B Geyer
(74) *Attorney, Agent, or Firm* — Blank Rome LLP (57) ABSTRACT

The present invention relates to a process for producing an electrolytic capacitor wherein—a primer solution e) is applied to a capacitor body (1), followed by an application of a solution or dispersion a) comprising a conjugated polymer b) and a solvent or dispersant d), followed by an at least partial removal of the solvent or dispersant d) for the formation of a polymeric outer layer (5) that is formed onto the capacitor body (1), and wherein the primer solution e) comprises at least one monofunctional amine and at least one carboxylic acid.

14 Claims, 2 Drawing Sheets

(56) References Cited

FOREIGN PATENT DOCUMENTS

| | | |
|---|---|---|
| JP | 2010116441 A | 5/2010 |
| JP | 2011138814 A | 7/2011 |
| JP | 2012180395 A | 9/2012 |
| WO | WO-2010089111 A1 | 8/2010 |
| WO | WO-2012112676 A2 | 8/2012 |
| WO | WO-2012112680 A2 | 8/2012 |

* cited by examiner

Fig. 1

Figure 2

MONOFUNCTIONAL AMINES AS ADHESION PRIMERS FOR CONDUCTIVE POLYMERS

This application is a national stage of International Patent Application No. PCT/EP2015/061939, filed May 29, 2015, which claims the benefit of European Patent Application No. EP 14001879.7, filed May 30, 2014, each of which is hereby incorporated by reference in its entirety.

The invention relates to a process for producing electrolytic capacitors with low equivalent series resistance, low residual current and high thermal stability, which consist of a solid electrolyte and an outer layer comprising conjugated polymers, to electrolytic capacitors produced by this process and to the use of such electrolytic capacitors.

A conventional solid electrolytic capacitor consists generally of a porous metal electrode, an oxide layer present on the metal surface, an electrically conductive solid which is introduced into the porous structure, an outer electrode (contact connection), for example a silver layer, and further electrical contacts and an encapsulation.

Examples of solid electrolytic capacitors are tantalum, aluminum, niobium and niobium oxide capacitors with charge transfer complexes, or manganese dioxide or polymer solid electrolytes. The use of porous bodies has the advantage that, owing to the high surface area, it is possible to achieve a very high capacitance density, i. e. a high electrical capacitance in a small space.

Owing to their high electrical conductivity, particularly suitable solid electrolytes are conjugated polymers. Conjugated polymers are also referred to as conductive polymers or as synthetic metals. They are gaining increasing economic significance since polymers have advantages over metals with regard to processability, to weight and to the controlled adjustment of properties by chemical modification. Examples of known conjugated polymers are polypyrroles, polythiophenes, polyanilines, polyacetylenes, polyphenylenes and poly(p-phenylenevinylenes), a particularly important and industrially utilized polythiophene being poly-3,4-(ethylene-1,2-dioxy)thiophene, often also referred to as poly(3,4-ethylenedioxythiophene), since it possesses, in its oxidized form, a very high conductivity and a high thermal stability.

Practical development in electronics is increasingly requiring solid electrolytic capacitors with very low equivalent series resistances (ESR). The reasons for this are, for example, falling logic voltages, a higher integration density and rising clock frequencies in integrated circuits. Moreover, a low ESR also lowers the power consumption, which is advantageous particularly for mobile, battery-operated applications. It is therefore desirable to reduce the ESR of solid electrolytic capacitors as far as possible.

European Patent EP-B-340 512 describes the production of a solid electrolyte from 3,4-ethylene-1,2-dioxythiophene and the use of the cationic polymer thereof, prepared by oxidative polymerization, as a solid electrolyte in electrolytic capacitors. Poly(3,4-ethylenedioxythiophene) as a replacement for manganese dioxide or for charge transfer complexes in solid electrolytic capacitors lowers the equivalent series resistance of the capacitor and improves the frequency behavior owing to the higher electrical conductivity.

In addition to a low ESR, modern solid electrolytic capacitors require a low residual current and a good stability with respect to external mechanical and thermal stresses. Especially during the production process, the encapsulation of the capacitor anodes involves high mechanical stresses which can greatly increase the residual current of the capacitor anode. When the capacitors are soldered on, high soldering temperatures of approx. 260° C. are used, which require a good thermal stability. The operation of the capacitors in an environment with elevated working temperature, for example in the automotive sector, also requires a high thermal stability.

Stability with respect to such stresses, and hence a low residual current, can be achieved in particular by an outer layer composed of conductive polymers with a thickness of approx. 5-50 μm on the capacitor anode. Such a layer serves as a mechanical buffer between the capacitor anode and the cathode-side contact connection. This prevents, for example, the silver layer (contact connection) from coming into direct contact with the dielectric or damaging it in the event of mechanical stress, thus increasing the residual current of the capacitor. The conductive polymeric outer layer itself should have so-called self-healing behavior: minor defects in the dielectric on the outer anode surface, which occur in spite of the buffer effect, are electrically insulated by virtue of the conductivity of the outer layer being destroyed by the electrical current at the defect site. The conductive polymeric outer layer must cover especially the edges and corners of the capacitor body, since the highest mechanical stresses occur thereon.

The formation of a thick polymeric outer layer by means of an in situ polymerization is very difficult. The layer formation requires many coating cycles. As a result of the large number of coating cycles, the outer layer becomes very inhomogeneous; especially the edges of the capacitor anode are often covered insufficiently. Japanese Patent Application JP-A 2003-188052 states that homogeneous edge coverage requires a complicated balance of the process parameters. However, this makes the production process very prone to faults. In addition, the layer polymerized in situ generally has to be freed of residual salts by washing, which causes holes in the polymer layer.

An impervious electrically conductive outer layer with good edge coverage can be achieved by electrochemical polymerization. However, electrochemical polymerization requires that a conductive film is first deposited on the insulating oxide layer of the capacitor anode and this layer is then electrically contacted for each individual capacitor. This contact connection is very costly and inconvenient in mass production and can damage the oxide layer.

In European Patent Application EP-A-1 524 678, a polymeric outer layer is obtained by applying a dispersion comprising particles of a conductive polymer and a binder. With these processes, it is possible to obtain polymeric outer layers relatively easily. However, the edge coverage in this process is not always reliable and reproducible. In addition, the thermal stability of the polymeric outer layer under prolonged stress at elevated temperature is insufficient.

European Patent Application EP-A-1 746 613 improves the process from EP-A-1 524 678 by virtue of solid particles having a diameter in the range from 0.7 to 20 μm being added to the dispersion. This significantly improves the edge and corner coverage. However, the addition of solid particles makes the polymeric outer film brittle, which can cause the outer layer to flake off locally and hence an increase in the residual current and in the ESR.

WO-A-2012/112676 discloses a process for preparing a solid electrolyte capacitor comprising the application of a coverage enhancing catalyst onto a solid electrolyte layer followed by the application of a polymeric outer layer based on a conductive polymer. The enhancing catalysts are compounds such a glycine, alanine or lysine, ammonium sulfonates such as ammonium tosylates comprising R—$SO_3^-$- anions and $RNH_3^+$-cations, or salts of tertiary amines such as $C_{16}H_{33}N(CH_3)_3^+Br^-$. However, the disadvantage of the enhancing catalysts disclosed in WO-A-2012/112676 is that the surface coverage of the solid electrolyte layer with the polymeric outer layer is still insufficient.

There was thus a need to improve the process for producing solid electrolytic capacitors described in WO-A-2012/112676 to the effect that a better surface coverage of the solid electrolyte layer with the polymeric outer layer can be achieved.

It was therefore an object of the present invention to provide such a process and the capacitors thus improved.

A contribution towards solving these objects is made by a process for producing an electrolytic capacitor, the process comprising process steps i) and ii):
i) providing a capacitor body that comprises
  an electrode body of an electrode material,
  a dielectric which at least partially covers the surface of this electrode material, and
  a solid electrolyte at least comprising an electrically conductive material which at least partially covers the dielectric surface;
ii) applying a primer solution e) to the capacitor body, preferably to the surface of the solid electrolyte, followed by an application of a solution or dispersion a) comprising a conjugated polymer b) and a solvent or dispersant d), followed by an at least partial removal of the solvent or dispersant d) for the formation of the polymeric outer layer that is formed onto the capacitor body, preferably onto the solid electrolyte;
wherein the primer solution e) comprises at least one monofunctional amine and at least one carboxylic acid.

Surprisingly, it has been discovered that when using a primer solution that comprises at least one monofunctional amine and at least one carboxylic acid the coverage of the capacitor body, in particular of the surface of the solid electrolyte, with a polymeric outer layer can be improved compared to the primer compounds used in the prior art.

The enumerations given below serve to illustrate the invention by way of example and should not be considered to be exclusive.

In the electrolytic capacitor produced by the process according to the invention, the electrode material preferably forms a porous body with high surface area, and is present, for example, in the form of a porous sintered body or of a roughened film. This body is also referred to hereinafter as electrode body for short.

The electrode body covered with a dielectric is also referred to hereinafter as oxidized electrode body for short. The term "oxidized electrode body" also includes those electrode bodies covered with a dielectric which has not been produced by oxidation of the electrode body.

The electrode body covered with a dielectric and completely or partially with a solid electrolyte is also referred to hereinafter as capacitor body for short.

The outer surface of the capacitor body is understood to mean the outer faces of the capacitor body.

The electrically conductive layer which is produced from the solution or dispersion a) by the process according to the invention is referred to here as polymeric outer layer.

In process step i) of the process according to the present invention a capacitor body is provided that comprises an electrode body of an electrode material, a dielectric which at least partially covers the surface of this electrode material, and a solid electrolyte at least comprising an electrically conductive material which at least partially covers the dielectric surface.

The electrode material preferably is a valve metal or a compound with electrical properties comparable to a valve metal. In the context of the invention, valve metals are understood to mean those metals whose oxide layers do not enable current flow in both directions equally: in the case of anodic voltage, the oxide layers of the valve metals block current flow, whereas cathodic voltage results in large currents which can destroy the oxide layer. The valve metals include Be, Mg, Al, Ge, Si, Sn, Sb, Bi, Ti, Zr, Hf, V, Nb, Ta and W, and also an alloy or compound of at least one of these metals with other elements. The best known representatives of the valve metals are Al, Ta, and Nb. Compounds with electrical properties comparable to a valve metal are those which have metallic conductivity, which are oxidizable and whose oxide layers have the above-described properties. For example, NbO possesses metallic conductivity, but is generally not considered to be a valve metal. Layers of oxidized NbO, however, have the typical properties of valve metal oxide layers, and so NbO or an alloy or compound of NbO with other elements are typical examples of such compounds with electrical properties comparable to a valve metal.

Preference is given to electrode materials composed of tantalum, aluminum and those electrode materials based on niobium or niobium oxide. Electrode materials based on niobium or niobium oxide are understood to mean those materials in which niobium or niobium oxide constitutes the component with the greatest quantitative proportion. The electrode material based on niobium or niobium oxide is preferably niobium, NbO, a niobium oxide $NbO_x$ where x may assume values of 0.8 to 1.2, niobium nitride, niobium oxynitride or mixtures of these materials, or an alloy or compound of at least one of these materials with other elements. Preferred alloys are alloys with at least one valve metal, for example Be, Mg, Al, Ge, Si, Sn, Sb, Bi, Ti, Zr, Hf, V, Nb, Ta or W. Accordingly, the term "oxidizable metal" means not just metals, but also an alloy or compound of a metal with other elements, provided that they possess metallic conductivity and are oxidizable. The oxidizable metals are, for example, sintered in powder form to a porous electrode body, or a porous structure is imparted to a metallic body. The latter can be done, for example, by etching a film.

For the formation of the dielectric layer the porous electrode bodies are oxidized, for example, in a suitable electrolyte, for example phosphoric acid, by applying a voltage. The magnitude of this forming voltage depends on the oxide layer thickness to be achieved and/or the later application voltage of the capacitor. Preferred forming voltages are 1 to 800 V, more preferably 1 to 300 V.

To produce the electrode body, preferably metal powders with a specific charge of 100 to 1 000 000 μC/g, more preferably with a specific charge of 500 to 500 000 μC/g, even more preferably with a specific charge of 1000 to 300 000 μC/g, exceptionally preferably with a specific charge of 1500 to 200 000 μC/g, are used. The specific charge of the metal powder is calculated as follows:

specific charge of the metal powder=(capacitance× anodization voltage)/weight of the oxidized electrode body.

The capacitance is determined from the capacitance of the oxidized electrode body measured at 120 Hz in an aqueous electrolyte. The electrical conductivity of the electrolyte is sufficiently great that, at 120 Hz, there is still no decline in the capacitance owing to the electrical resistivity of the electrolyte. For example, 18% aqueous sulfuric acid electrolytes are used for the measurement.

The electrode bodies used have a porosity of 10 to 90%, preferably of 30 to 80%, more preferably of 50 to 80%. The porous electrode bodies have a mean pore diameter of 10 to 10000 nm, preferably of 50 to 5000 nm, more preferably of 100 to 3000 nm.

Accordingly, the present invention more preferably provides a process for producing electrolytic capacitors, characterized in that the valve metal or the compound of electrical properties comparable to a valve metal is tantalum, niobium, aluminum, titanium, zirconium, hafnium, vanadium, an alloy or compound of at least one of these metals with other elements, NbO or an alloy or compound of NbO with other elements.

The dielectric consists preferably of an oxide of the electrode material. It optionally comprises further elements and/or compounds.

The capacitance of the capacitor depends not only on the type of dielectric but also on the surface area and the thickness of the dielectric. The specific charge is a measure of how much charge per unit weight the oxidized electrode body can accommodate. The specific charge of the capacitor is calculated as follows:

specific charge of the capacitor=(capacitance×rated voltage)/weight of the oxidized electrode body.

The capacitance is determined from the capacitance of the finished capacitor measured at 120 Hz and the rated voltage is the specified use voltage of the capacitor. The weight of the oxidized electrode body is based on the simple weight of the dielectric-coated porous electrode material without polymer, contacts and encapsulations.

The electrolytic capacitors produced by the novel process preferably have a specific charge of 500 to 500000 µC/g, more preferably a specific charge of 750 to 250000 µC/g, even more preferably a specific charge of 1000 to 1500000 µC/g, exceptionally preferably a specific charge of 1500 to 100000 µC/g.

The electrically conductive material of the solid electrolyte may comprise a conductive polymer or nonpolymeric conductive material, for example charge transfer complexes, for example TCNQ (7,7,8,8-tetracyano-1,4-quinodimethane), manganese dioxide or salts, for example those which can form ionic liquids.

The solid electrolyte preferably comprises a conductive polymer. The conductive polymers used may be the above-mentioned conjugated polymers which are also used for the polymeric outer layer. More preferably, the solid electrolyte comprises poly(3,4-ethylenedioxythiophene) as the conductive polymer; most preferably, the solid electrolyte comprises poly(3,4-ethylenedioxythio-phene)/polystyrenesulfonic acid as the conductive polymer.

The solid electrolyte preferably forms, on the dielectric surface, a layer with a thickness less than 1000 nm, more preferably less than 200 nm, most preferably less than 50 nm.

The coverage of the dielectric with the solid electrolyte can be determined as follows: the capacitance of the capacitor is measured in the dry and moist states at 120 Hz. The coverage is the ratio of the capacitance in the dry state to the capacitance in the moist state, expressed in percent. "Dry state" means that the capacitor has been dried at elevated temperature (80-120° C.) over several hours before being analyzed. "Moist state" means that the capacitor is exposed to saturated air humidity under elevated pressure, for example in a steam boiler, over several hours. In the course of this, the moisture penetrates into pores not covered by the solid electrolyte, and acts there as a liquid electrolyte.

The coverage of the dielectric by the solid electrolyte is preferably greater than 50%, more preferably greater than 70%, most preferably greater than 80%.

In principle, the capacitor body that is provided in process step i) can be produced as follows: first, for example, a valve metal powder with a high surface area is compressed and sintered to a porous electrode body. This typically also involves pressing an electrical contact wire, preferably of a valve metal, for example tantalum, into the electrode body. It is alternatively also possible to etch metal foils in order to obtain a porous film.

The electrode body is, for example, coated by electrochemical oxidation with a dielectric, i.e. an oxide layer. On the dielectric, for example by means of oxidative polymerization, a conductive polymer is then deposited chemically or electrochemically and forms the solid electrolyte. To this end, precursors for preparing conductive polymers, one or more oxidizing agents, and if appropriate counter-ions are applied together or successively to the dielectric of the porous electrode body and polymerized chemically and oxidatively, or precursors for producing conductive polymers and counter-ions are polymerized by electrochemical polymerization on the dielectric of the porous electrode body. To form the solid electrolyte, the conductive materials used are preferably dispersions or solutions of conductive polymers, for example optionally substituted polythiophenes, polypyrroles or polyanilines. Preference is given to dispersions of conductive polythiophenes based on poly(3,4-ethylenedioxythiophene), as described, for example, in WO-A-2007/031206.

According to the process according to the present invention, after preparing the solid electrolyte in a further process step ii) a solution e) comprising at least one a monofunctional amine and at least one carboxylic acid, preferably an aqueous solution e) comprising at least one a monofunctional amine and at least one carboxylic, is applied to the capacitor body, preferably to the surface of the solid electrolyte, followed by an application of a solution or dispersion a) comprising a conjugated polymer b) and a solvent or dispersant d), followed by an at least partial removal of the solvent or dispersant d) for the formation of the polymeric outer layer that is formed onto the capacitor body, preferably onto the solid electrolyte.

The expression "monofunctional amine", as used herein, refers to a compound that, as the sole functional group, comprises a single amine group.

Preferably, the monofunctional amine is a primary, secondary or tertiary amine of formula (I)

in which R may be identical or different and represents
a hydrogen,
a $C_1$-$C_{300}$-aliphatic or hetero aliphatic group,
a $C_6$-$C_{18}$, aromatic or hetero aromatic group or
a $C_7$-$C_{18}$ aralkyl or hetero aralkyl group,
wherein two R-groups may be linked to each other.

According to a preferred embodiment of the process according to the present invention the monofunctional amine is a primary amine, preferably a primary amine of formula (I), in which two of the three R-groups represent a hydrogen and in which the third R-group is a linear $C_1$-$C_{18}$-alkylgroup, a branched $C_3$-$C_{18}$-alkyl-group, a $C_5$-$C_{18}$-cycloalkyl-group, a liner $C_1$-$C_{18}$-hydroxyalkyl-group with at least one OH-group, a branched $C_3$-$C_{18}$-hydroxyalkyl-group with at least one OH-group, a cyclic $C_5$-$C_{18}$-hydroxyalkyl-group with at least one OH-group, a polyalkylenoxid-group of the formula —$(CH_2CH_2O)_n$—OR' or —$(CH_2CHCH_3O)_n$—OR', in which n is an integer from 2 to 100 and R' represents H or a linear $C_1$-$C_{10}$-alkyl group, a branched $C_3$-$C_{10}$-alkyl-group or a $C_5$-$C_{10}$-cycloalkyl-group, a $C_2$-$C_{18}$-alkenyl-group, a $C_6$-$C_{18}$-aryl-group or a $C_7$-$C_{18}$-aralkyl-group, most preferably a linear $C_1$-$C_{18}$-alkyl-group. In the above mentioned R-groups at least one hydrogen may also be substituted by a halogen such as fluorine, chlorine or bromine.

Examples of suitable amines ethylamine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methylpropyl-amine, methylethylamine, bis(1-methyl)propylamine, 1,1-dimethylethylamine, pentylamine, dipentylamine, tripentylamine, 2-pentylamine, 3-pentylamine, 2-methylbutylamine, 3-methylbutylamine, bis(3-methylbutylamine), tris(3-methylbutylamine), hexylamine, octylamine, di-N-octylamine, tri-N-octylamine, tert.-octylamine (1,1,3,3-Tetramethylbutylamine), dodecylamine, 2-ethylhexylamine, decylamine, N-methylbutylamine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyldiethanol-amine, dimethylethanolamine, diethylethanolamine, N-butylethanolamine, N-butyldiethanolamine, dibutylethanolamine, cyclohexylethanolamine, cyclohexyldiethanolamine, N-ethylethanolamine, N-propylethanolamine, tert-butylethanolamine, tert-butyldiethanolamine, propanolamine, dipropanolamine, tripropanolamine or benzylamine.

Examples of suitable amines in which two R-groups may be linked to each other are saturated or unsaturated heterocyclic amines such as aziridine, azirine, azetidine, azete, pyrrolidine, pyrrole, piperidine, pyridine, azepane, azepine or morpholine.

A particularly preferred monofunctional amine that can be used in the process according to the present invention is hexylamine.

The carboxylic acid is preferably a monofunctional, a difunctional or a trifunctional carboxylic acid or a or a polyfunctional carboxylic acid, wherein the carboxylic acid may also comprise a functional group selected from the group consisting of a hydroxyl group, an ether group, a thiol group or a thioether group. Suitable monofunctional carboxylic acids can be selected from the group consisting of formic acid, acetic acid, propanoic acid, butyric acid, pentanoic acid, hexanoic acid, heptanoic acid, octanoic acid and isomers thereof, wherein hexanoic acid is a particularly preferred monocarboxylic acid. Suitable difunctional carboxylic acids can be selected from the group consisting of tartaric acid, oxalic acid, malonic acid, succinic acid, glutaric acid, adipic acid, pimelic acid, suberic acid, azelaic acid, sebacic acid, dodecanedioic acid, maleic acid and fumaric acid, wherein adipic acid is a particularly preferred dicarboxylic acid. Suitable trifunctional carboxylic acids can be selected from the group consisting of citric acid, isocitric acid, aconitic acid, trimesic acid and trimellitic acid, wherein trimesic acid is a particularly preferred tricarboxylic acid. Suitable polyfunctional carboxylic acids are, for example, polyacrylates or polymethacrylates.

It is furthermore preferred, that the at least one monofunctional amine and the at least one carboxylic acid are present in the primer solution in such an relative amount the molar ratio of the amine to the carboxylic acid groups of the carboxylic acid in the primer solution e) is in the range from 0.1:1 to 10:1, preferably in the range from 0.2:1 to 5:1 and most preferably in the range from 0.5:1 to 2:1.

The concentration of the monofunctional amine in the primer solution e) that is applied in process step ii) is preferably in the range from 0.01 to 10 mol/l, more preferably in the range from 0.05 to 5 mol/l and most preferably in the range from 0.1 to 1 mol/l, and the concentration of the carboxylic acid in the primer solution e) that is applied in process step ii) is preferably in the range from 0.01 to 10 mol/l, more preferably in the range from 0.05 to 5 mol/l and most preferably in the range from 0.1 to 1 mol/l.

The primer solution e) comprises, in addition to the at least one monofunctional amine and the at least one carboxylic acid, a solvent or dispersant.

The solvent can be water or an organic solvent. Examples of organic solvents or dispersants for the monofunctional amine and at least one carboxylic acid include the following organic solvents: linear or branched $C_1$- to $C_6$-alcohols such as methanol, ethanol, isopropanol, n-propanol, n-butanol, isobutanol and tert-butanol; cyclic $C_3$- to $C_8$-alcohols such as cyclohexanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulfoxides and sulfones such as dimethyl sulfoxide and sulfolane; aliphatic carboxamides such as methylacetamide, dimethylacetamide and dimethylformamide; aliphatic and araliphatic ethers such as diethyl ether and anisole. It is also possible to use mixtures of the aforementioned organic solvents as the solvent. In addition, it is also possible to use a mixture of water with the aforementioned organic solvents or dispersants as the solvent.

Preferred solvents or dispersants are water or other protic solvents such as linear or branched $C_1$- to $C_6$-alcohols such as methanol, ethanol, isopropanol, n-propanol, n-butanol, isobutanol and tert-butanol; cyclic $C_3$- to $C_8$-alcohols such as cyclohexanol. Particular preference is given to mixtures of water with these alcohols or with mixtures of these alcohols, very particular preference to mixtures of water with methanol, ethanol, isopropanol or n-propanol.

According to an particularly preferred embodiment of the process according to the present invention the primer solution e) is tan aqueous primer solution.

Furthermore, in the process according to the present invention it is also possible to
first apply a solution or dispersion a) comprising a conjugated polymer b) and a solvent or dispersant d) to the capacitor body, preferably to the surface of the solid electrolyte, optionally followed by an at least partial removal of the solvent or dispersant d), and then
to apply the primer solution e) to the capacitor body, preferably to the surface of the solid electrolyte, followed by a further application of a solution or dispersion a) comprising a conjugated polymer b) and a solvent or dispersant d), followed by an at least partial removal of the solvent or dispersant d) for the formation of the polymeric outer layer that is formed onto the capacitor body, preferably onto the solid electrolyte.

Thus, the present invention covers every process which comprises the subsequent steps of first applying the primer solution e) to the capacitor body and then applying a solution or dispersion a) of a conjugated polymer b), irrespective if any further coatings have been applied to the capacitor body before applying the primer solution e).

In the process according to the present invention the pH of the primer solution e) is preferably adjusted to a value in the range from 1 to 12, preferably in the range from 1.5 to 10 and most preferably in the range from 2.0 to 7 by means of an organic acid. The pH can be adjusted, for example, by adding an acid or base. The acids used may be inorganic acids, for example sulfuric acid, phosphoric acid or nitric acid, or organic acids, for example carboxylic or sulfonic acids, such as p-toluene sulfonic acid or polystyrene sulfonic acid (PSS), whereas suitable bases are alkali or earth alkali hydroxides such as NaOH, KOH, $CaOH_2$ or $MgOH_2$, ammonia or carbonates such as $Na_2CO_3$, $K_2CO_3$, $NaHCO_3$ or $KHCO_3$.

The primer solution e) is applied to the capacitor body by known processes, for example by spin-coating, impregnation, casting, dropwise application, spray application, vapor deposition, sputtering, sublimation, knife-coating, painting or printing, for example inkjet, screen or pad printing. The primer solution e) is applied at least to the corners and/or edges of the capacitor body. In a simple manner, it is applied at least to the entire outer surface or part of the outer surface of the capacitor body. The primer solution e) may additionally also be introduced into the porous capacitor body. After the primer solution e) has been applied, the solvent is preferably removed at least partly, for example by a thermal treatment. For the removal of the water, preference is given to drying temperatures between 15° C. and 500° C., more preferably between 25° C. and up to 300° C. and most preferably between 50° C. and up to 150° C.

After the primer solution e) has been applied to the capacitor body, a solution or dispersion a) comprising a conjugated polymer b) and a solvent or dispersant d) is applied. After applying the primer solution e) in the form of an aqueous solution and optionally after removing the water, the solution or dispersion a) can also be applied repeatedly. Preference is given to applying the primer solution e), optionally removing water and then applying the solution or dispersion a) repeatedly in order to achieve thicker and/or denser outer layers. Before applying the primer compound e), it is also already possible to apply layers of the solution or dispersion a).

The parts of the solution or the dispersion a) which were in contact with the capacitor body after application of the primer solution e) but do not remain thereon and are reused are preferably in contact with one or more ion exchangers continuously or in phases. When, for example, the capacitor body, after application of the primer solution e), is immersed into a bath comprising the solution or the dispersion a), it may be advantageous to remove contamination in the solution or the dispersion a) by cations which originate from the primer solution e), in order to prevent crosslinking reactions in the bath. To this end, the solution or dispersion a) from the bath is preferably contacted with one or more cation exchangers continuously or in phases. The solution or dispersion a) may additionally also be contacted with one or more anion exchangers in order also to remove any anions present in the primer solution e) in addition to the cations. The solution or dispersion a) from the bath is preferably pumped through a cartridge comprising the ion exchanger(s) continuously or in phases. Useful cation and anion exchangers include, for example, the Lewatit® ion exchangers from Lanxess AG, Leverkusen, for example the Lewatit MP 62 anion exchanger and the Lewatit S100 cation exchanger.

The conjugated polymer b) of the solution or dispersion a) preferably has a specific electrical conductivity of greater than 10 S/cm, more preferably greater than 20 S/cm, even more preferably greater than 50 S/cm, exceptionally preferably greater than 100 S/cm and in a particularly preferred embodiment greater than 200 S/cm.

The conjugated polymer b) is preferably present in particles which are present in dispersion a).

The particles comprising the conjugated polymer b) in the dispersion have, in the processes according to the invention, preferably a mean diameter of 1-10 000 nm, more preferably of 1-1000 nm, most preferably of 5-500 nm.

The diameter of the particles comprising the conjugated polymer b) is determined by means of an ultracentrifuge measurement. The general method is described in Colloid Polym. Sci. 267, 1113-1116 (1989). In the case of particles which swell in the dispersion, the particle size is determined in the swollen state. A diameter distribution of the particles is based on a mass distribution of the particles in the dispersion as a function of the particle diameter.

The solutions or dispersions a) preferably contain only small amounts, if any, of metals and transition metals. Metals are understood here to refer to metals or metal ions of main or transition group metals of the Periodic Table of the Elements. As is well known, transition metals in particular can damage the dielectric, such that the elevated residual currents resulting therefrom significantly reduce the lifetime of the capacitors or even make use of the capacitors impossible under harsh conditions, such as high temperatures and/or high air humidity.

In the process, the solution or dispersion a) preferably has a content of metals less than 5000 mg/kg, more preferably less than 1000 mg/kg, most preferably less than 200 mg/kg. Examples of metals here include Na, K, Mg, Al, Ca, Fe, Cr, Mn, Co, Ni, Cu, Ru, Ce or Zn.

In the process, the solution or dispersion a) preferably has a content of transition metals less than 1000 mg/kg, more preferably less than 100 mg/kg, most preferably less than 20 mg/kg. Examples of transition metals here include Fe, Cu, Cr, Mn, Ni, Ru, Ce, Zn or Co.

In the process, the solution or dispersion a) preferably has an iron content less than 1000 mg/kg, more preferably less than 100 mg/kg, most preferably less than 20 mg/kg.

The low concentrations of metals in the solutions or dispersions have the great advantage that the dielectric is not damaged when the polymeric outer layer is formed and in the later operation of the capacitor.

The solution or dispersion a) preferably comprises at least one polymeric organic binder c). Useful particularly preferred polymeric organic binders c) include, for example, polyvinyl alcohols, polyvinylpyrrolidones, polyvinyl chlorides, polyvinyl acetates, polyvinyl butyrates, polyacrylic esters, polyacrylamides, polymethacrylic esters, polymethacrylamides, polyacrylonitriles, styrene/acrylic ester, vinyl acetate/acrylic ester and ethylene/vinyl acetate copolymers, polybutadienes, polyisoprenes, polystyrenes, polyethers, polyesters, polycarbonates, polyurethanes, polyamides, polyimides, polysulfones, melamine-formaldehyde resins, epoxy resins, silicone resins or celluloses. Further useful polymeric organic binders c) are preferably also those which are obtained by adding crosslinkers, for example melamine compounds, capped isocyanates or functional silanes, for example 3-glycidoxypropyltrialkoxysilane, tetraethoxysilane and tetraethoxysilane hydrolyzate, or crosslinkable polymers, for example polyurethanes, polyacrylates or polyolefins, and subsequently crosslinking. Such crosslinking products suitable as polymeric binders c) may also additionally be formed, for example, by reaction of the crosslinkers added with any polymeric anions present in the solution or dispersion a). Preference is given to those binders c) which have a sufficient thermal stability to withstand the thermal stresses to which the finished capacitors are exposed later, for example soldering temperatures of 220 to 260° C.

The solids content of the polymeric binder c) in the solution or dispersion a) is 0.1-90 percent by weight (% by weight), preferably 0.3-30% by weight and most preferably 0.5-10% by weight.

The solutions or dispersions a) comprise one or more solvents or dispersants d). Examples of solvents or dispersants d) include, for example, the following solvents: aliphatic alcohols such as methanol, ethanol, isopropanol and butanol; aliphatic ketones such as acetone and methyl ethyl ketone; aliphatic carboxylic esters such as ethyl acetate and butyl acetate; aromatic hydrocarbons such as toluene and xylene; aliphatic hydrocarbons such as hexane, heptane and cyclohexane; chlorohydrocarbons such as dichloromethane and dichloroethane; aliphatic nitriles such as acetonitrile, aliphatic sulfoxides and sulfones such as dimethyl sulfoxide and sulfolane; aliphatic carboxamides such as methylacetamide, dimethylacetamide and dimethylformamide; aliphatic and araliphatic ethers such as diethyl ether and anisole. It is also possible to use mixtures of the aforementioned organic solvents as the solvent. In addition, it is also possible to use water or a mixture of water with the aforementioned organic solvents as the solvent or dispersant d).

Preferred solvents or dispersants d) are water or other protic solvents such as alcohols, e.g. methanol, ethanol, i-propanol and butanol, and mixtures of water with these alcohols; the particularly preferred solvent is water.

If appropriate, the binder c) can also function as the solvent or dispersant d).

In the context of the invention, the term "polymers" includes all compounds having more than one identical or different repeat unit.

The conjugated polymers b) contain at least one sequence of alternating double and single bonds or an uninterrupted sequence of aromatic or heteroaromatic rings.

Electrically conductive polymers are understood here to mean especially the compound class of the conjugated polymers which, after oxidation or reduction, possess electrical conductivity. Preferably, such conjugated polymers are considered to be conductive polymers which, after oxidation, possess an electrical conductivity in the order of magnitude of at least $1\ \mu S\ cm^{-1}$.

It is particularly preferred that the solution or dispersion a) comprises, as the conjugated polymer b), an electrically conductive polymer selected from the group consisting of an optionally substituted polythiophene, an optionally polyaniline and an optionally substituted polypyrrole.

More preferably, the conjugated polymer b) comprises at least one polythiophene with repeat units of the general formula (III) or of the general formula (IV) or of the general formula (V), or repeat units of the formulae (III) and (IV), or repeat units of the formulae (III) and (V), or repeat units of the formulae (IV) and (V), or repeat units of the formulae (III), (IV) and (V), (III)

(IV)

(V)

in which
A is an optionally substituted $C_1$-$C_5$-alkylene radical,
R is independently H, a linear or branched, optionally substituted $C_1$-$C_{18}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical or a hydroxyl radical,
x is an integer from 0 to 8 and,
in the case that a plurality of R radicals are bonded to A, they may be the same or different.

The general formulae (III) and (IV) should be understood such that x substituents R may be bonded to the alkylene radical A.

Particular preference is given to polythiophenes with repeat units of the general formula (III) or (IV) or repeat units of the general formulae (III) and (IV), in which A is an optionally substituted $C_2$-$C_3$-alkylene radical and x is 0 or 1.

A very particularly preferred conjugated polymer b) is poly(3,4-ethylenedioxythiophene), which is optionally substituted.

In the context of the invention, the prefix "poly-" should be understood to mean that more than one identical or different repeat unit is present in the polymer or polythiophene. The polythiophenes contain a total of n repeat units of the general formula (III) or of the general formula (IV) or of the general formula (V) or of the general formulae (III) and (IV) or of the general formulae (III) and (V) or of the general formulae (IV) and (V) or of the general formulae (III), (IV) and (V), where n is an integer of 2 to 2000, preferably 2 to 100. The repeat units of the general formula (III)) or of the general formula (IV) or of the general formula (V) or the repeat units of the general formulae (III) and (IV) or the repeat units of the general formulae (III) and (V) or the repeat units of the general formulae (IV) and (V) or the repeat units of the general formulae (III), (IV) and (V) may each be the same or different within a polythiophene. Preference is given to polythiophenes having in each case identical repeat units of the general formula (III) or of the general formula (IV) or of the general formula (V) or having in each case identical repeat units of the general formulae (III) and (IV), or of the general formulae (III) and (V), or of the general formulae (IV) and (V), or having in each case identical repeat units of the general formulae (III), (IV) and (V). Particular preference is given to polythiophenes having in each case identical repeat units of the general formula (III) or of the general formula (IV) or having in each case identical repeat units of the general formulae (III) and (IV).

At the end groups, the polythiophenes preferably each bear H.

In the context of the invention, $C_1$-$C_5$-alkylene radicals A are preferably methylene, ethylene, n-propylene, n-butylene or n-pentylene. $C_1$-$C_{18}$-Alkyl R is preferably linear or branched $C_1$-$C_{18}$-alkyl radicals such as methyl, ethyl, n- or isopropyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl or n-octadecyl, $C_5$-$C_{12}$-cycloalkyl radicals R are, for example, cyclopentyl, cyclohexyl, cycloheptyl, cyclooctyl, cyclononyl or cyclodecyl, $C_6$-$C_{14}$-aryl radicals R are, for example, phenyl or naphthyl, and $C_7$-$C_{18}$-aralkyl radicals R are, for example, benzyl, o-, m-, p-tolyl, 2,3-, 2,4-, 2,5-, 2,6-, 3,4-, 3,5-xylyl or mesityl. The above list serves to illustrate the invention by way of example and should not be considered to be exclusive.

In the context of the invention, any further substituents of the A radicals and/or of the R radicals include numerous organic groups, for example alkyl, cycloalkyl, aryl, aralkyl, alkoxy, halogen, ether, thioether, disulfide, sulfoxide, sulfone, sulfonate, amino, aldehyde, keto, carboxylic ester, carboxylic acid, carbonate, carboxylate, cyano, alkylsilane and alkoxysilane groups, and also carboxamide groups.

Possible substituents for polyaniline or polypyrrole include, for example, the A and R radicals listed above and/or the further substituents of the A and R radicals. Preference is given to unsubstituted polyanilines.

The scope of the invention encompasses all radical definitions, parameters and enumerations above and specified below, in general or within preferred ranges, with one another, i.e. including any combinations between the particular ranges and preferred ranges.

The conductive polymers b), in particular the polythiophenes, in the process according to the present invention may be uncharged or cationic. In preferred embodiments, they are cationic, "cationic" relating only to the charges which reside on the main polythiophene chain. According to the substituent on the R radicals, the polythiophenes may bear positive and negative charges in the structural unit, in which case the positive charges are on the main polythiophene chain and the negative charges are, if present, on the R radicals substituted by sulfonate or carboxylate groups. The positive charges of the main polythiophene chain may be partly or fully saturated by the anionic groups which may be present on the R radicals. Viewed overall, the polythiophenes in these cases may be cationic, uncharged or even anionic. Nevertheless, in the context of the invention, all are considered to be cationic polythiophenes, since the positive charges on the main polythiophene chain are crucial. The positive charges are not shown in the formulae, since their exact number and position cannot be stated unambiguously. The number of positive charges is, however, at least 1 and at most n, where n is the total number of all repeat units (identical or different) within the polythiophene.

To balance the positive charge, if this has not already been done by the optionally sulfonate- or carboxylate-substituted and thus negatively charged R radicals, the cationic polythiophenes require anions as counter-ions.

Counter-ions may be monomeric or polymeric anions, the latter also being referred to hereinafter as polyanions. Thus, according to a preferred embodiment of the process according to the present invention the conjugated polymer b) is a cationic polymer and solution or dispersion a) comprises a polymeric anion serving as a counter-ion for the conjugated polymer.

Polymeric anions are preferred over monomeric anions, since they contribute to film formation and, owing to their size, lead to thermally more stable, electrically conductive films.

Polymeric anions here may, for example, be anions of polymeric carboxylic acids, such as polyacrylic acids, polymethacrylic acid or polymaleic acids, or polymeric sulfonic acids, such as polystyrenesulfonic acids and polyvinylsulfonic acids. These polycarboxylic and -sulfonic acids may also be copolymers of vinylcarboxylic and vinylsulfonic acids with other polymerizable monomers, such as acrylic esters and styrene.

A preferred polymeric anion in the conjugated polymer b) is an anion of a polymeric carboxylic or sulfonic acid. A particularly preferred polymeric anion is the anion of polystyrenesulfonic acid (PSS).

The molecular weight of the polyacids which afford the polyanions is preferably 1000 to 2000000, more preferably 2000 to 500000. The polyacids or alkali metal salts thereof are commercially available, for example polystyrenesulfonic acids and polyacrylic acids, or else are preparable by known processes (see, for example, Houben Weyl, Methoden der organischen Chemie [Methods of Organic Chemistry], vol. E 20 Makromolekulare Stoffe [Macromolecular Substances], part 2, (1987), p. 1141 ff.).

Polymeric anion(s) and electrically conductive polymers may be present in the dispersion a) especially in a weight ratio of 0.5:1 to 50:1, preferably of 1:1 to 30:1, more preferably 2:1 to 20:1. The weight of the electrically conductive polymers corresponds here to the initial weight of the monomers used, assuming that there is full conversion in the polymerization.

The monomeric anions used are, for example, those of $C_1$-$C_{20}$-alkanesulfonic acids, such as those of methanesulfonic acid, ethanesulfonic acid, propanesulfonic acid, butanesulfonic acid or higher sulfonic acids such as dodecanesulfonic acid, of aliphatic perfluorosulfonic acids, such as trifluoromethanesulfonic acid, perfluorobutanesulfonic acid or perfluorooctanesulfonic acid, of aliphatic $C_1$-$C_{20}$-carboxylic acids such as 2-ethylhexylcarboxylic acid, of aliphatic perfluorocarboxylic acids, such as trifluoroacetic acid or perfluorooctanoic acid, and aromatic sulfonic acids optionally substituted by $C_1$-$C_{20}$-alkyl groups, such as benzenesulfonic acid, o-toluenesulfonic acid, p-toluenesulfonic acid or dodecylbenzenesulfonic acid, and of cycloalkanesulfonic acids such as camphorsulfonic acid, or tetrafluoroborates, hexafluorophosphates, perchlorates, hexafluoroantimonates, hexafluoroarsenates or hexachloroantimonates.

Preferred monomeric anions are the anions of p-toluenesulfonic acid, methanesulfonic acid or camphorsulfonic acid.

Cationic polythiophenes which contain anions as counter-ions to balance the charge are often also referred to in the technical field as polythiophene/(poly)anion complexes. According to a particular preferred embodiment of the process according to the present invention the solution or dispersion a) comprises, as the conjugated polymer, poly(3,4-ethylenedioxythiophene), being present in the form of a poly(3,4-ethylenedioxythiophene)/polystyrenesulfonic acid-complex.

Precursors for the preparation of the conjugated polymers b) in the solution or dispersion a), also referred to hereinafter as precursors, are understood to mean appropriate monomers or derivatives thereof. It is also possible to use mixtures of different precursors. Suitable monomeric precursors are, for example, optionally substituted thiophenes, pyrroles or anilines, preferably optionally substituted thiophenes, more preferably optionally substituted 3,4-alkylenedioxythiophenes, 3,4-alkyleneoxythiathiophenes or thieno[3,4-b]thiophenes.

Examples of optionally substituted 3,4-alkylenedioxythiophenes, 3,4-alkyleneoxythiathiophenes or thieno[3,4-b]thiophenes include the compounds of the general formula (VI) or of the general formula (VII) or of the general formula (VIII) or a mixture of thiophenes of the general formulae (VI) and (VII) or a mixture of thiophenes of the general formula (VI) and (VIII), or a mixture of thiophenes of the general formula (VII) and (VIII) or a mixture of thiophenes of the general formula (VI), (VII) and (VIII)

(VI)

(VII)

(VIII)

in which
A is an optionally substituted $C_1$-$C_5$-alkylene radical, preferably an optionally substituted $C_2$-$C_3$-alkylene radical,
R is a linear or branched, optionally substituted $C_1$-$C_{18}$-alkyl radical, preferably linear or branched, optionally substituted $C_1$-$C_{14}$-alkyl radical, an optionally substituted $C_5$-$C_{12}$-cycloalkyl radical, an optionally substituted $C_6$-$C_{14}$-aryl radical, an optionally substituted $C_7$-$C_{18}$-aralkyl radical, an optionally substituted $C_1$-$C_4$-hydroxyalkyl radical, preferably optionally substituted $C_1$-$C_2$-hydroxyalkyl radical, or a hydroxyl radical,
x is an integer of 0 to 8, preferably of 0 to 6, more preferably 0 or 1, and,
in the case that a plurality of R radicals are bonded to A, they may be the same or different.

Very particularly preferred monomeric precursors are optionally substituted 3,4-ethylenedioxythiophenes. Examples of substituted 3,4-ethylenedioxythiophenes include the compounds of the general formula (IX)

(IX)

in which
R and x are each as defined for the general formulae (VI) and (VII).

In the context of the invention, derivatives of these monomeric precursors are understood, for example, to mean dimers or trimers of these monomeric precursors. Also possible as derivatives are higher molecular weight derivatives, i.e. tetramers, pentamers, etc., of the monomeric precursors. Examples of derivatives of substituted 3,4-alkylenedioxythiophenes include the compounds of the general formula (X)

(X)

in which
n is an integer of 2 to 20, preferably 2 to 6, more preferably 2 or 3,
and
A, R and x are each as defined for the general formulae (VI) and (VII).

The derivatives may be formed either from identical or different monomer units and be used in pure form or in a mixture with one another and/or with the monomeric precursors. Oxidized or reduced forms of these precursors are, in the context of the invention, also encompassed by the term "precursors", provided that their polymerization forms the same conductive polymers as for the precursors detailed above.

Useful substituents for the above-specified precursors, especially for the thiophenes, preferably for the 3,4-alkylenedioxythiophenes, include the R radicals specified for the general formulae (VI), (VII) or (VIII).

Useful substituents for pyrroles and anilines include, for example, the A and R radicals detailed above and/or the further substituents of the A and R radicals. Any further substituents of the A and/or the R radicals include the organic groups specified in connection with the general formulae (III), (IV) or (V).

Processes for preparing the monomeric precursors for the preparation of conductive polymers and the derivatives thereof are known to those skilled in the art and are described, for example, in L. Groenendaal, F. Jonas, D. Freitag, H. Pielartzik & J. R. Reynolds, Adv. Mater. 12 (2000) 481-494 and literature cited therein.

The 3,4-alkyleneoxythiathiophenes of the formula (VI) required for the preparation of the polythiophenes to be used are known to those skilled in the art or are preparable by known processes (for example according to P. Blanchard, A. Cappon, E. Levillain, Y. Nicolas, P. Frère and J. Roncali, Org. Lett. 4 (4), 2002, p. 607-609).

The thieno[3,4-b]thiophenes of the formula (VIII) required for the preparation of the polythiophenes to be used are known to those skilled in the art or are preparable by known processes (for example according to US2004/0074779A1).

The dispersions are prepared from the above-described precursors, for example, analogously to the conditions specified in EP-A 440 957. An improved variant for the preparation of the dispersions is that of using ion exchangers to remove the inorganic salt content or a portion thereof. Such a variant is described, for example, in DE-A-19627071. The ion exchanger can, for example, be stirred with the product, or the product is conducted through a column filled with ion exchange column.

Preparation of a polyaniline/polyanion or polythiophene/polyanion complex and subsequent dispersion or re-dispersion in one or more solvent(s) is also possible.

The solids content of the conjugated polymer b) in the solution or dispersion a) is 0.1-90% by weight, preferably 0.5-30% by weight and most preferably 0.5-10% by weight.

The solution or dispersion a) may also comprise further substances such as surface-active substances, for example ionic and/or nonionic surfactants; adhesion promoters, for example organofunctional silanes or hydrolyzates thereof, e.g. 3-glycidoxypropyltrialkoxysilane, 3-aminopropyltriethoxysilane, 3-mercaptopropyltrimethoxysilane, 3-methacryloyloxypropyltrimethoxysilane, vinyltrimethoxysilane or octyltriethoxysilane; crosslinkers such as melamine compounds, capped isocyanates, functional silanes—e.g. tetraethoxysilane, alkoxysilane-hydrolyzates, for example based on tetraethoxysilane, epoxysilanes such as 3-glycidoxypropyltrialkoxysilane-polyurethanes, polyacrylates or polyolefin dispersions, or further additives.

In the context of the invention, the solution or dispersion a) may comprise surface-active substances, adhesion promoters, crosslinkers and further additives, either in each case alone or in any desired combination thereof.

The solutions or dispersions a) preferably comprise further additives which enhance the conductivity, for example compounds containing ether groups, for example tetrahydrofuran; compounds containing lactone groups, such as γ-butyrolactone, γ-valerolactone; compounds containing amide or lactam groups, such as caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, pyrrolidone; sulfones and sulfoxides, for example sulfolane (tetramethylenesulfone), dimethyl sulfoxide (DMSO); sugars or sugar derivatives, for example sucrose, glucose, fructose, lactose, sugar alcohols, for example sorbitol, mannitol; imides, for example succinimide or maleimide; furan derivatives, for example 2-furancarboxylic acid, 3-furancarboxylic acid, and/or di- or polyalcohols, for example ethylene glycol, glycerol or di- or triethylene glycol. Particular preference is given to using, as conductivity-enhancing additives, tetrahydrofuran, N-methylformamide, N-methylpyrrolidone, ethylene glycol, dimethyl sulfoxide or sorbitol. The further additives may be present either in each case alone or in any desired combination thereof in the solution or dispersion a).

The solution or dispersion a) may have a pH of 1 to 14, preference being given to a pH of 1 to 10, particular preference to a pH of 1 to 8, the pH being measured at 25° C.

To adjust the pH, bases or acids, for example, can be added to the solutions or dispersions. The bases used may be inorganic bases, for example sodium hydroxide, potassium hydroxide, calcium hydroxide or ammonia, or organic bases, for example ethylamine, diethylamine, triethylamine, propylamine, dipropylamine, tripropylamine, isopropylamine, diisopropylamine, butylamine, dibutylamine, tributylamine, isobutylamine, diisobutylamine, triisobutylamine, 1-methylpropyl-amine, methylethylamine, bis(1-methyl)propylamine, 1,1-dimethylethylamine, pentylamine, dipentylamine, tripentylamine, 2-pentylamine, 3-pentylamine, 2-methylbutylamine, 3-methylbutylamine, bis(3-methylbutylamine), tris(3-methylbutylamine), hexylamine, octylamine, 2-ethylhexylamine, decylamine, N-methylbutyl amine, N-ethylbutylamine, N,N-dimethylethylamine, N,N-dimethylpropyl, N-ethyldiisopropylamine, allylamine, diallylamine, ethanolamine, diethanolamine, triethanolamine, methylethanolamine, methyldiethanol-amine, dimethylethanolamine, diethylethanolamine, N-butylethanolamine, N-butyldiethanolamine, dibutylethanolamine, cyclohexylethanolamine, cyclohexyldiethanolamine, N-ethylethanolamine, N-propylethanolamine, tert-butylethanolamine, tert-butyldiethanolamine, propanolamine, dipropanolamine, tripropanolamine or benzylamine. The acids used may be inorganic acids, for example sulfuric acid, phosphoric acid or nitric acid, or organic acids, for example carboxylic or sulfonic acids. Preference is given to those additives which do not impair the film formation of the solutions or dispersions a) and remain in the solid electrolyte at relatively high temperatures, for example soldering temperatures, for example the bases dimethylethanolamine, diethanolamine, ammonia or triethanolamine, and the acid polystyrenesulfonic acid.

According to the method of application, the viscosity of the solution or dispersion a) may be between 0.1 and 100 000 mPa·s (measured at 20° C. and a shear rate of 100 s$^{-1}$ with a rheometer). The viscosity is preferably 1 to 10 000 mPa·s, more preferably between 10 and 1000 mPa·s, most preferably 30 to 500 mPa·s.

The application of solution or dispersion a) to the capacitor body (preferably to the solid electrolyte layer onto which the primer compound e) in process step i) has been applied) can be accomplished by known processes, for example by spin-coating, impregnation, casting, dropwise application, spray application, vapor deposition, sputtering, sublimation, knife-coating, painting or printing, for example inkjet, screen or pad printing.

The solvent or dispersant d) can be removed after the solution or dispersion has been applied by simple evaporation at room temperature. However, it is also possible for at least a portion of the solvent or dispersant d) to remain in the polymeric outer layer. According to the type of solvent or dispersant d), it can also be cured either fully or only the portion still remaining after partial removal.

To achieve higher processing speeds, it is, however, more advantageous to remove the solvents or dispersants d) at elevated temperatures, for example at temperatures of 20 up to 300° C., preferably 40 up to 250° C. A thermal after-treatment can be undertaken directly with the removal of the solvent or else at a different time from the completion of the coating.

Depending on the kind of solution or dispersion d) used for the coating, the duration of the heat treatment is 5 seconds to several hours. For the thermal treatment, it is also possible to use temperature profiles with different temperatures and residence times.

The heat treatment can be performed, for example, in such a way that the coated oxidized electrode bodies are moved through a heated chamber at the desired temperature at such a speed that the desired residence time at the selected temperature is achieved, or contacted with a hotplate at the desired temperature for the desired residence time. In addition, the thermal treatment can, for example, be effected in an oven or several ovens with different temperatures.

Optionally, the polymeric outer layer is after-treated, in order to increase the conductivity of the conjugated polymer in the polymeric outer layer. The after-treatment may consist, for example, of a thermal after-treatment. Optionally, further layers are applied to the polymeric outer layer. A coating with layers of good conductivity, such as graphite and silver, serves as the electrode for discharging the current. Finally, the capacitor is contact-connected and encapsulated.

The thickness of the polymeric outer layer is preferably 1-1000 µm, more preferably 1-100 µm, even more preferably 2-50 µm, very especially preferably 4-20 µm. The layer thickness may vary on the outer surface. More particularly, the layer thickness may be thicker or thinner at the edges of the capacitor body than on the side faces of the capacitor body. However, preference is given to a virtually homogeneous layer thickness.

The polymeric outer layer may be part of a multilayer system which forms the outer layer of the capacitor body. It is also possible for further functional layers to be present on the polymeric outer layer. In addition, a plurality of polymeric outer layers may be present on the capacitor body.

In a particularly preferred embodiment, the electrolytic capacitor produced by the novel process comprises a solid electrolyte comprising poly(3,4-ethylenedioxythiophene) (PEDT) as the conductive material, and a polymeric outer layer comprising polystyrenesulfonic acid (PSS) and poly (3,4-ethylenedioxythiophene).

In a very particularly preferred embodiment, the electrolytic capacitor produced by the novel process comprises a solid electrolyte comprising PEDT/PSS and a polymeric outer layer comprising PEDT/PSS. The solid electrolytic capacitor produced by the processes according to the invention is notable for a low residual current, a low equivalent series resistance and a high thermal stability.

The process according to the invention makes it possible to produce, in a particularly simple manner, solid electrolytic capacitors with a polymeric outer layer, which is impervious even at the edges and corners of the capacitor body. The solid electrolytic capacitors are notable for a low ESR, low residual currents and a high thermal stability. The electrolytic capacitors produced by the process according to the invention thus likewise form part of the subject-matter of the present invention.

The electrolytic capacitors produced in accordance with the invention are outstandingly suitable, owing to their low residual current and their low ESR, for use in electronic circuits, for example as filter capacitors or decoupling capacitors. The use also forms part of the subject-matter of the invention. Preference is given to electronic circuits, as present, for example, in computers (desktops, laptops, servers), in computer peripherals (e.g. PC cards), in portable electronic devices, for example cellphones, digital cameras or amusement electronics, in devices for amusement electronics, for example in CD/DVD players and computer game consoles, in navigation systems, in telecommunications equipment, in domestic appliances, in voltage supplies or in automotive electronics.

The figures and examples which follow serve to illustrate the invention by way of example and should not be interpreted as a restriction.

Figure 1:
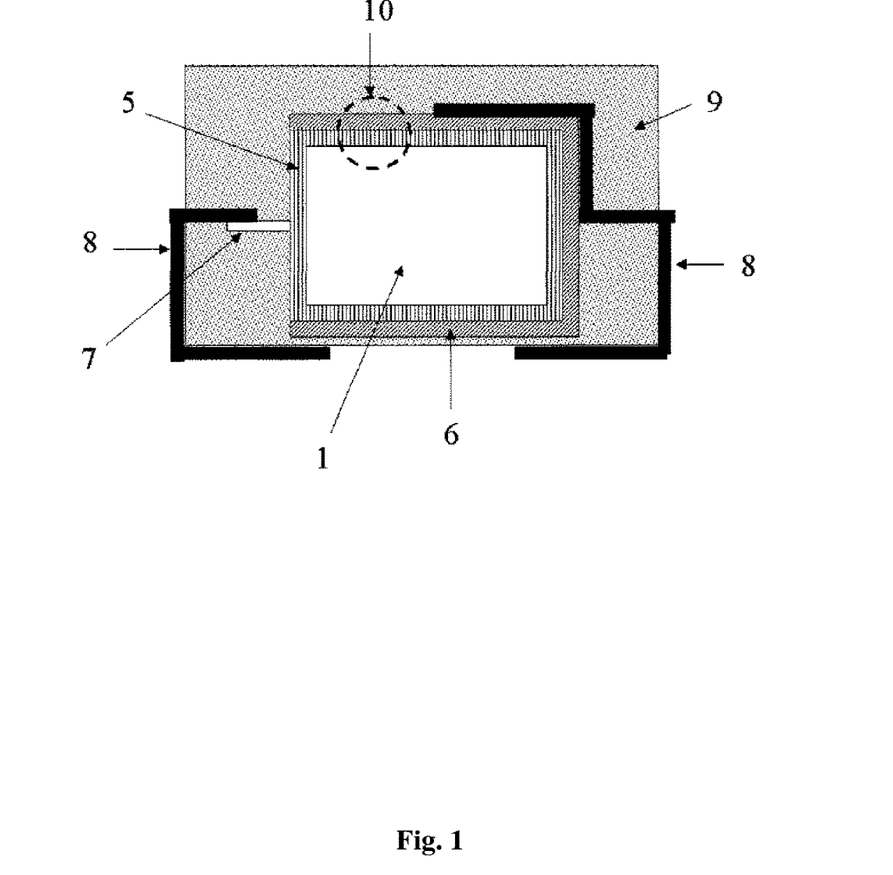
Figure 2:
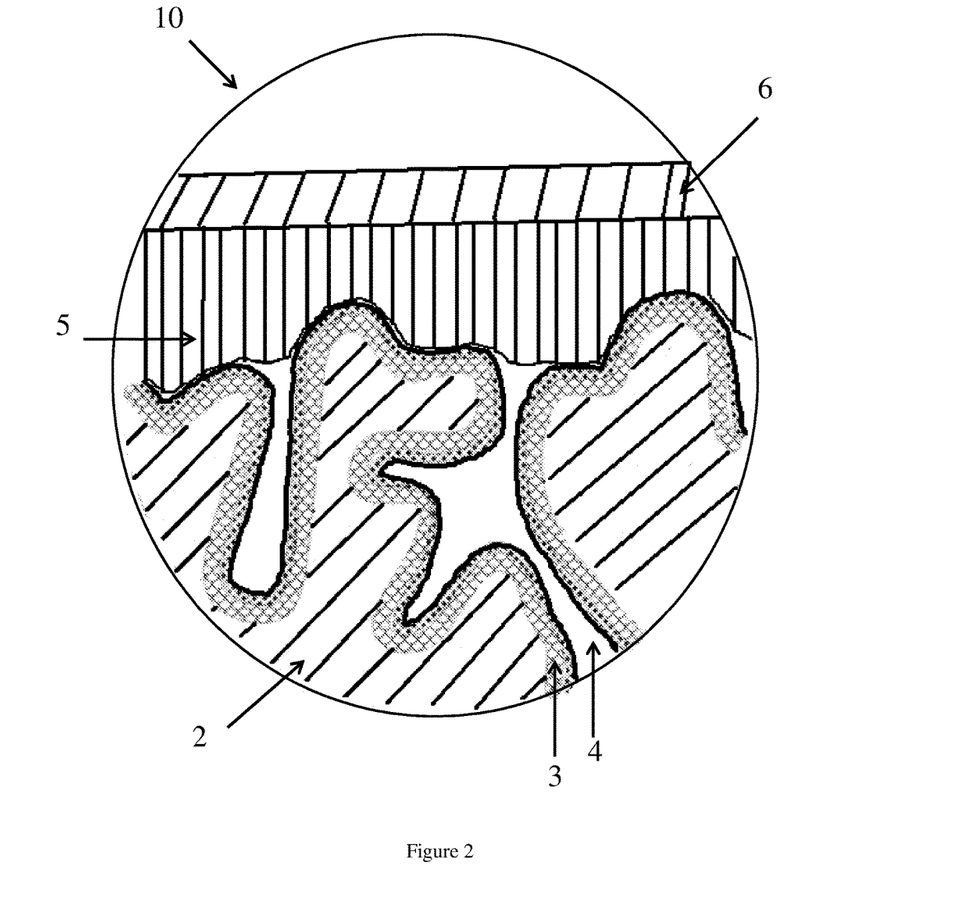

The polymeric outer layer is preferably present, as shown schematically and by way of example in FIG. 1 and FIG. 2, over the entire outer surface or a part of the outer surface of the capacitor body. The outer surface is understood to mean the outer faces of the capacitor body.

FIG. 1 describes a schematic diagram of the construction of a solid electrolytic capacitor using the example of a tantalum capacitor comprising
1 capacitor body
5 polymeric outer layer
6 graphite/silver layer
7 wire contact to electrode body 2
8 outer contacts
9 encapsulation
10 detail FIG. 2 describes the enlarged detail 10 from FIG. 1 of the schematic layer structure of the tantalum capacitor comprising
10 detail
2 porous electrode body (anode)
3 dielectric
4 solid electrolyte (cathode)

5 polymeric outer layer
6 graphite/silver layer

When, instead of a porous sintered body, porous films, for example aluminum foils, are used as the electrode body, a similar construction to that described above arises in principle. In order to achieve higher capacitances, a plurality of films are preferably contact-connected and encapsulated together in parallel in one housing.

EXAMPLES

Example 1

Preparation of the Tantalum Anode:

Tantalum powder with a specific capacitance of 18000 µFV/g was pressed to pellets with incorporation of a Tantalum wire and sintered in order to form an electrode body with the dimensions of 1.5 mm×2.9 mm×4.0 mm. 5 of these porous electrode bodies were anodized to 100 V in a phosphoric acid electrolyte to form a dielectric.

Example 2

Polymer Dispersion for the Preparation of the Solid Electrolyte:

A 2 L glass reactor with stirrer and thermometer was initially charged with 868 g of deionized water, 330 g of an aqueous polystyrenesulfonic acid solution with a mean molecular weight (weight average $M_w$) of 70000 g/mol and a solids content of 3.8% by weight. The reaction temperature was kept between 20° C. and 25° C. With stirring 5.1 g 3,4-ethylenedioxythiophene were added. The solution was stirred for 30 minutes. Subsequently, 0.03 g of iron(III) sulphate and 9.5 g of sodium persulfate were added and the solution was stirred for a further 24 hours. After the reaction had ended, 100 ml of a strongly acidic cation exchanger (Lewatit S100, Lanxess AG) and 250 ml of a weakly basic anion exchanger (Lewatit MP62, Lanxess AG) were added to remove inorganic salts, and the solution was stirred for a further 2 h. The ion exchangers were filtered off.

The PEDOT/PSS dispersion was homogenized ten times at a pressure of 700 bar with a high-pressure homogenizer. Subsequently, the dispersion was concentrated to a solids content of 2.5% and then homogenized five times at a pressure of 1500 bar with a high-pressure homogenizer.

Subsequently, the dispersion was diluted to a solids content of 1.04% and 96 g of the diluted dispersion were admixed with 4 g of dimethyl sulfoxide (DMSO) and stirred intensively.

Example 3

Preparation of Primer Solutions:

A beaker with a stirrer was charged with the monofunctional amine and the monofunctional carboxylic acid mentioned in table 1 in the concentrations in water or ethanol as given in table 1. The mixture was then stirred vigorously for one hour.

Example 4

Polymer Dispersion for the Preparation of the Outer Layer:

A 5 L glass reactor with stirrer and thermometer was initially charged with 1736 g of deionized water, 660 g of an aqueous polystyrenesulfonic acid solution with a mean molecular weight (weight average $M_w$) of 70000 g/mol and a solids content of 3.8% by weight. The reaction temperature was kept between 20° C. and 25° C. With stirring 10.2 g 3,4-ethylenedioxythiophene were added. The solution was stirred for 30 minutes. Subsequently, 0.06 g of iron(III)

sulphate and 19 g of sodium persulfate were added and the solution was stirred for a further 24 hours (h). After the reaction had ended, 200 ml of a strongly acidic cation exchanger (Lewatit 5100, Lanxess AG) and 500 ml of a weakly basic anion exchanger (Lewatit MP62, Lanxess AG) were added to remove inorganic salts, and the solution was stirred for a further 2 hours. The ion exchangers were filtered off. Subsequently, the dispersion was concentrated to a solids content of 1.5%.

In a beaker with a stirrer, 160 g of this concentrated dispersion, 28 g of deionized water, 6 g of a sulfopolyester (Eastek 1100, solids content 30%, mean molecular weight 10000-15000 g/mol, Eastman) 8 g of dimethyl sulfoxide, 1 g of 3-glycidoxypropyltrimethoxysilane (Silquest A-187, OSi Specialities) and 0.4 g of wetting agent (Dynol 604, Air Products) were mixed vigorously for one hour.

Example 5

Preparation of a Capacitor with the Primer Compound:

The oxidized electrode bodies from Example 1 were impregnated in the dispersion from Example 2 for 1 minute. This was followed by drying at 120° C. for 10 minutes. This sequence of impregnation and drying was carried out nine further times. Subsequently, an impregnation into the solution from Example 3 for 1 minute was carried out, followed by drying at 120° C. for 10 minutes. After this, an impregnation into the dispersion from Example 4 for 1 minute was carried out, followed by drying at 120° C. for 10 minutes.

Subsequently, an impregnation into the solution from Example 3 for 1 min was carried out, followed by drying at 120° C. for 10 min. After this, an impregnation into the dispersion from Example 4 for 1 min was carried out, followed by drying at 120° C. for 10 min. Subsequently, an impregnation into the solution from Example 3 for 1 minute was carried out, followed by drying at 120° C. for 10 minutes. After this, an impregnation into the dispersion from Example 4 for 1 minute was carried out, followed by drying at 120° C. for 10 minutes.

The completeness of the coating of the capacitor body with the polymeric outer layer was determined visually using a light microscope ("complete": complete coverage of the capacitor body with the polymeric outer layer; "incomplete": incomplete coverage of the capacitor body with the polymeric outer layer).

TABLE 1

| concentration amine [mol/l] | amine | concentration acid [mol/l] | acid | concentration ratio (amine:acid) | molar ratio (amine group:acid group) | solvent | coverage |
|---|---|---|---|---|---|---|---|
| 0.1[1)] | A | 0.1 | pTSA | 1:1 | 1:1 | ethanol | incomplete |
| 0.1 | A | 0.1 | ACA | 1:1 | 1:1 | ethanol | complete |
| 0.2 | A | 0.1 | ADA | 1:1 | 1:1 | ethanol | complete |
| 0.2 | A | 0.1 | SA | 2:1 | 1:1 | ethanol | complete |
| 0.3 | A | 0.1 | TA | 3:1 | 1:1 | ethanol | complete |
| 1.0 | A | 0.1 | HA | 10:1 | 10:1 | ethanol | complete |
| 0.5 | A | 0.1 | HA | 5:1 | 5:1 | ethanol | complete |
| 0.1 | A | 0.1 | HA | 1:1 | 1:1 | ethanol | complete |
| 0.5 | A | 0.5 | HA | 1:1 | 1:1 | ethanol | complete |
| 1.0 | A | 1.0 | HA | 1:1 | 1:1 | ethanol | complete |
| 0.1 | A | 1.0 | HA | 1:10 | 1:10 | ethanol | complete |
| 0.1 | A | 0.5 | HA | 1:5 | 1:5 | ethanol | complete |
| 0.5 | A | 0.5 | ACA | 1:1 | 1:1 | ethanol | complete |
| 1.0 | A | 1.0 | ACA | 1:1 | 1:1 | ethanol | complete |
| 0.1 | A | 1.0 | ACA | 1:10 | 1:10 | ethanol | complete |
| 0.1 | A | 0.5 | ACA | 1:5 | 1:5 | ethanol | complete |
| 0.1 | B | 0.1 | HA | 1:1 | 1:1 | ethanol | complete |
| 0.1 | C | 0.1 | HA | 1:1 | 1:1 | ethanol | complete |
| 0.1 | D | 0.1 | HA | 1:1 | 1:1 | ethanol | complete |
| 0.1 | E | 0.1 | HA | 1:1 | 1:1 | ethanol | complete |
| 0.1 | F | 0.1 | HA | 1:1 | 1:1 | ethanol | complete |
| 0.1[1)] | A | 0.1 | pTSA | 1:1 | 1:1 | water | incomplete |
| 0.1 | A | 0.1 | AA | 1:1 | 1:1 | water | complete |
| 0.1 | A | 0.1 | HA | 1:1 | 1:1 | water | complete |
| 0.5 | A | 0.5 | AA | 1:1 | 1:1 | water | complete |
| 0.1 | A | 0.5 | AA | 1:5 | 1:5 | water | complete |

A = hexylamine
B = tert-octylamine
C = octylamine
D = di-octylamine
E = tri-octylamine
F = dodecylamine
HA = hexanoic acid
ACA = acetic acid
ADA = adipic acid
SA = succinic acid
TA = trimesic acid
pTSA = para-toluenesulfonic acid
[1)]not according to the present invention

The invention claimed is:

1. A process for producing an electrolytic capacitor, the process comprising process steps i) and ii):
   i) providing a capacitor body that comprises
      an electrode body of an electrode material,
      a dielectric which at least partially covers the surface of this electrode material, and
      a solid electrolyte at least comprising an electrically conductive material which at least partially covers the dielectric surface,
   ii) applying a primer solution e) to the capacitor body, followed by an application of a solution or dispersion a) comprising a conjugated polymer b) and a solvent or dispersant d), followed by an at least partial removal of the solvent or dispersant d) for the formation of a polymeric outer layer that is formed onto the capacitor body;
   wherein the primer solution e) comprises at least one monofunctional amine and at least one carboxylic acid.

2. The process according to claim 1, wherein the monofunctional amine is a primary, secondary or tertiary amine of formula (I)

(I)

wherein each R group may be identical or different and represents
   a hydrogen,
   a $C_1$-$C_{300}$-aliphatic or hetero aliphatic group,
   a $C_6$-$C_{18}$, aromatic or hetero aromatic group, or
   a $C_7$-$C_{18}$ aralkyl or hetero aralkyl group,
wherein two R-groups may be linked to each other.

3. The process according to claim 2, wherein each R group independently represents
   a hydrogen,
   a linear $C_1$-$C_{18}$-alkyl-group,
   a branched $C_3$-$C_{18}$-alkyl-group,
   a $C_5$-$C_{18}$-cycloalkyl-group,
   a linear $C_1$-$C_{18}$-hydroxyalkyl-group with at least one OH-group,
   a branched $C_3$-$C_{18}$-hydroxyalkyl-group with at least one OH-group,
   a cyclic $C_5$-$C_{18}$-hydroxyalkyl-group with at least one OH-group,
   a polyalkylenoxid-group of the formula —$(CH_2CH_2O)_n$—OR' or —$(CH_2CHCH_3O)_n$—OR', in which n is an integer from 2 to 100 and R' represents H or a linear $C_1$-$C_{10}$-alkyl-group, a branched $C_3$-$C_{10}$-alkyl-group or a $C_5$-$C_{10}$-cycloalkyl-group,
   a $C_2$-$C_{18}$-alkenyl-group,
   a $C_6$-$C_{18}$-aryl-group, or
   a $C_7$-$C_{18}$-aralkyl-group.

4. The process according to claim 1, wherein the monofunctional amine is a primary amine.

5. The process according to claim 4, wherein the monofunctional amine is selected from the group consisting of hexylamine, tert-octylamine, octylamine, di-octylamine, tri-octylamine and dodecylamine.

6. The process according to claim 1, wherein the carboxylic acid is a monofunctional, a difunctional or a trifunctional carboxylic acid or a polyfunctional carboxylic acid, wherein the carboxylic acid may also comprise a functional group selected from the group consisting of a hydroxyl-group, an ether-group, a thiol-group or a thioether-group.

7. The process according to claim 6, wherein the carboxylic acid is selected from the group consisting of acetic acid, hexanoic acid, adipic acid, succinic acid and trimesic acid.

8. The process according to claim 1, wherein the molar ratio of the amine to the carboxylic acid groups of the carboxylic acid in the primer solution e) is in the range from 0.1:1 to 10:1.

9. The process according to claim 1, wherein the concentration of the monofunctional amine in the primer solution e) that is applied in process step ii) is in the range from 0.01 to 10 mol/l and wherein the concentration of the carboxylic acid in the primer solution e) that is applied in process step ii) is in the range from 0.01 to 10 mol/l.

10. The process according to claim 1, wherein the conjugated polymer b) is a cationic polymer and wherein solution or dispersion a) comprises a polymeric anion serving as a counter-ion for conjugated polymer.

11. The process according to claim 10, wherein the polymeric anion is an anion of a polymeric carboxylic or sulfonic acid.

12. The process according to claim 1, wherein in process step ii) the primer compound e) and the solution or dispersion a) are applied sequentially and repeatedly.

13. The process according to claim 1, wherein the solution or dispersion a) comprises, as the conjugated polymer, an electrically conductive polymer selected from the group consisting of an optionally substituted polythiophene, an optionally polyaniline and an optionally substituted polypyrrole.

14. The process according to claim 1, wherein the solution or dispersion a) comprises, as the conjugated polymer, poly(3,4-ethylenedioxythiophene), being present in the form of a poly(3,4-ethylenedioxythiophene)/polystyrenesulfonic acid-complex.

* * * * *